US007412567B2

(12) United States Patent
Zeffer et al.

(10) Patent No.: US 7,412,567 B2
(45) Date of Patent: Aug. 12, 2008

(54) VALUE-BASED MEMORY COHERENCE SUPPORT

(75) Inventors: Håkan E. Zeffer, Uppsala (SE); Erik E. Hagersten, Palo Alto, CA (US); Anders Landin, San Carlos, CA (US); Shailender Chaudhry, San Francisco, CA (US); Paul N. Loewenstein, Palo Alto, CA (US); Robert E. Cypher, Saratoga, CA (US); Zoran Radovic, Lidingo (SE)

(73) Assignee: Sun Microsystems, Inc., Santa Clara, CA (US)

( * ) Notice: Subject to any disclaimer, the term of this patent is extended or adjusted under 35 U.S.C. 154(b) by 173 days.

(21) Appl. No.: 11/413,243

(22) Filed: Apr. 28, 2006

(65) Prior Publication Data

US 2007/0255907 A1    Nov. 1, 2007

(51) Int. Cl.
*G06F 12/00* (2006.01)
(52) U.S. Cl. ............................ 711/141; 711/144
(58) Field of Classification Search ................ None
See application file for complete search history.

(56) References Cited

U.S. PATENT DOCUMENTS

| | | | | |
|---|---|---|---|---|
| 5,197,146 | A * | 3/1993 | LaFetra | 711/144 |
| 6,996,683 | B2 * | 2/2006 | Chauvel et al. | 711/141 |
| 2004/0078528 | A1 * | 4/2004 | Chauvel et al. | 711/141 |

OTHER PUBLICATIONS

Håkan E. Zeffer, et al., "TMA: A Trap-Based Memory Architecture," Dept. of Information Technology, Uppsala University, May 2005, 11 pages.

Håkan E. Zeffer, et al., "TMA: A Trap-Based Memory Architecture," Dept. of Information Technology, Uppsala University, Technical Report 2005-041, Dec. 2005, 12 pages.

Daniel J. Scales, et al., "Shasta: A Low Overhead, Software-Only Approach for Supporting Fine-Grain Shared Memory," Digital Equipment Corp., #23 from May 2005 paper, 12 pages, Proceedings of ASPLOS-VII, pp. 174-185, Oct. 1996.

Ioannis Schoinas, et al., "Fine-Grain Access Control for Distributed Shared Memory," Appears in "ASPLOS VI," Oct. 1994, ACM, 10 pages.

Derek Chiou, et al., "Start-NG: Delivering Seamless Parallel Computing," CSG Memo 371, Jul. 9, 1995, 13 pages, MIT Laboratory for Computer Science, Proceedings of the 1st International Euro-Par Conference, (Euro-Par 1995), pp. 101-116, Aug. 1995.

* cited by examiner

*Primary Examiner*—Kevin Verbrugge
(74) *Attorney, Agent, or Firm*—Lawrence J. Merkel; Meyertons, Hood, Kivlin, Kowert & Goetzel, P.C.

(57) ABSTRACT

In one embodiment, a processor comprises a coherence trap unit and a trap logic coupled to the coherence trap unit. The coherence trap unit is also coupled to receive data accessed in response to the processor executing a memory operation. The coherence trap unit is configured to detect that the data matches a designated value indicating that a coherence trap is to be initiated to coherently perform the memory operation. The trap logic is configured to trap to a designated software routine responsive to the coherence trap unit detecting the designated value. In some embodiments, a cache tag in a cache may track whether or not the corresponding cache line has the designated value, and the cache tag may be used to trigger a trap in response to an access to the corresponding cache line.

19 Claims, 6 Drawing Sheets

VALUE-BASED MEMORY COHERENCE SUPPORT

BACKGROUND

1. Field of the Invention

This invention is related to the field of computer systems and, more particularly, to coherence mechanisms in computer systems.

2. Description of the Related Art

Historically, shared memory multiprocessing systems have implemented hardware coherence mechanisms. The hardware coherence mechanisms ensure that updates (stores) to memory locations by one processor (or one process, which may be executed on different processors at different points in time) are consistently observed by all other processors that read (load) the updated memory locations according to a specified ordering model. Implementing coherence may aid the correct and predictable operation of software in a multi-processing system. While hardware coherence mechanisms simplify the software that executes on the system, the hardware coherency mechanisms may be complex and expensive to implement (especially in terms of design time). Additionally, if errors in the hardware coherence implementation are found, repairing the errors may be costly (if repaired via hardware modification) or limited (if software workarounds are used).

Other systems have used a purely software approach to the issue of shared memory. Generally, the hardware in such systems makes no attempt to ensure that the data for a given memory access (particularly loads) is the most up to date. Software must ensure that non-updated copies of data are invalidated in various caches if coherent memory access is desired. While software mechanisms are more easily repaired if an error is found and are more flexible if changing the coherence scheme is desired, they typically have much lower performance than hardware mechanisms.

SUMMARY

In one embodiment, a processor comprises a coherence trap unit and a trap logic coupled to the coherence trap unit. The coherence trap unit is also coupled to receive data accessed in response to the processor executing a memory operation. The coherence trap unit is configured to detect that the data matches a designated value indicating that a coherence trap is to be initiated to coherently perform the memory operation. The trap logic is configured to trap to a designated software routine responsive to the coherence trap unit detecting the designated value.

In another embodiment, a cache comprises a data memory configured to store a plurality of cache lines of data, a tag memory configured to store a plurality of cache tags corresponding to the plurality of cache lines, and a control unit coupled to the data memory and the tag memory. Each of the plurality of cache tags comprises an indication of whether or not the corresponding cache line is storing one or more data values that match a designated value, wherein the designated value indicates that an access to the corresponding cache line causes a trap to software to ensure cache coherence. The control unit is configured to detect the indication responsive to a cache access and to signal a processor coupled to the cache to cause the trap.

In an embodiment, a method comprises detecting that data corresponding to a memory operation has a designated value that indicates a trap to software to ensure coherence is to be performed; and trapping to the software responsive to the detecting.

BRIEF DESCIPTION OF THE DRAWINGS

The following detailed description makes reference to the accompanying drawings, which are now briefly described.

Figure 1:
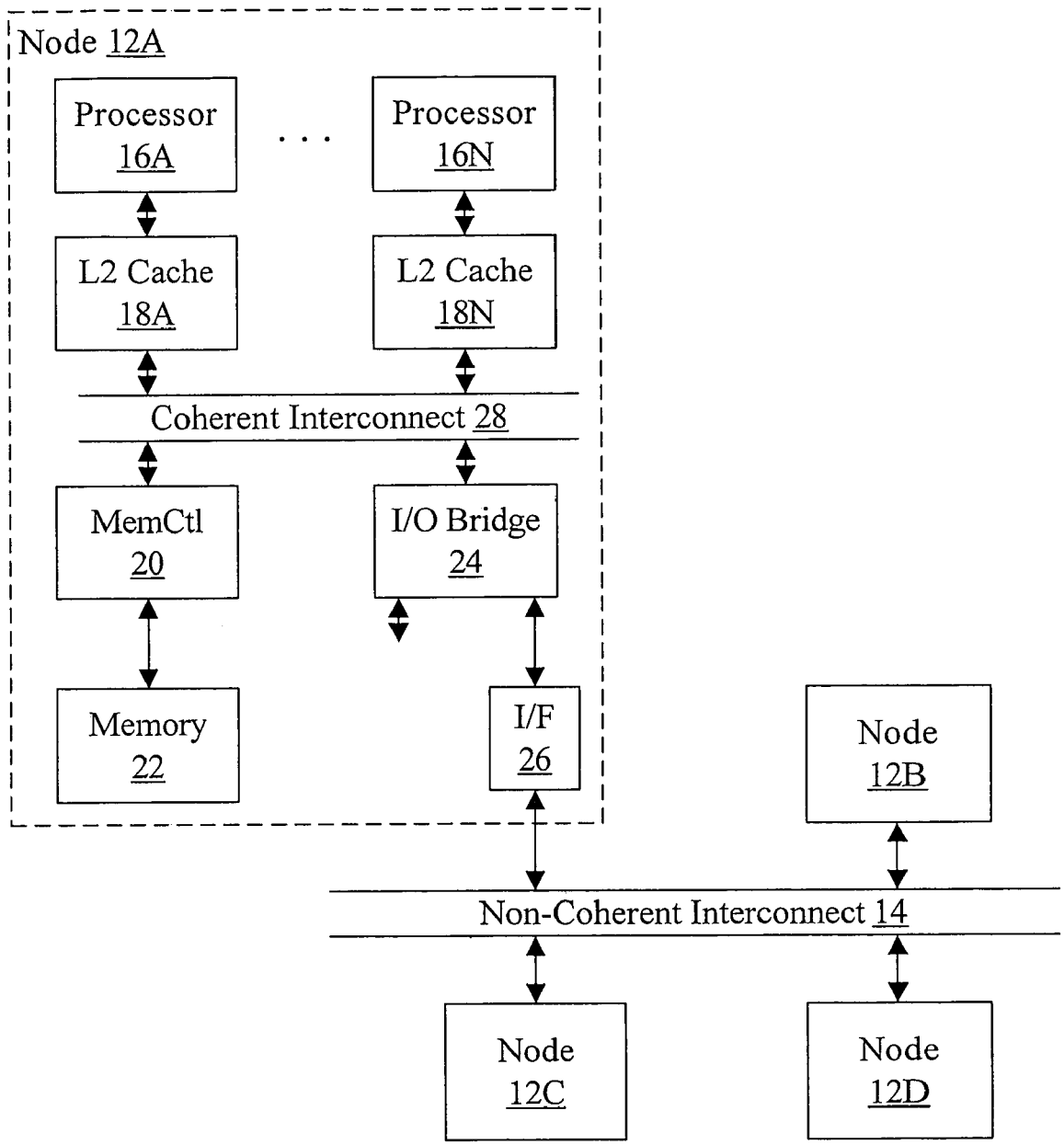
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 comprises a plurality of nodes 12A-12D coupled to a non-coherent interconnect 14. The node 12A is shown in greater detail for one embodiment, and other nodes 12B-12D may be similar. In the illustrated embodiment, the node 12A includes one or more processors 16A-16N, corresponding L2 caches 18A-18N, a memory controller 20 coupled to a memory 22, an input/output (I/O) bridge 24 coupled to one or more I/O interfaces including an interface 26 to the interconnect 14. In the illustrated embodiment, the L2 caches 18A-18N are coupled to respective processors 16A-16N and to a coherent interconnect 28. In other embodiments, a given L2 cache may be shared by two or more processors 16A-16N, or a single L2 cache may be shared by all processors 16A-16N. In still other embodiments, the L2 caches 18A-18N may be eliminated and the processors 16A-16N may couple directly to the interconnect 28. The memory controller 20 is coupled to the interconnect 28, and to the memory 22.

The memory 22 in the node 12A and similar memories in other nodes 12B-12D may form a distributed shared memory for the system 10. In the illustrated embodiment, each node 12A-12D implements hardware-based coherence internally. The distributed shared memory may also be coherent. The coherence of the distributed shared memory may be maintained primarily in software, with hardware support in the processors 16A-16N and the L2 caches 18A-18N. The memory system (memory controller 20 and memory 22) may remain unchanged from an embodiment in which the node 12A is the complete system, in some embodiments.

The hardware support may comprise detecting a designated value in the data accessed by a memory operation executed by a processor 16A-16N, and trapping to a software coherence routine in response to the detection. The designated value may be used by the software coherence mechanism to indicate that the data is invalid in the node. That is, the coherent copy of the data being accessed exists in another node, and coherence activity is needed to obtain the data and/or the right to access the data as specified by the memory operation. The designated value may also be referred to as the coherence trap (CT) value.

As used herein, a memory operation may comprise any read or write of a memory location performed by a processor as part of executing an instruction. A load memory operation (or more briefly, a load) is a read operation that reads data from a memory location. A store memory operation (or more briefly, a store) is a write operation that updates a memory location with new data. The memory operation may be explicit (e.g. a load or store instruction), or may be an implicit part of an instruction that has a memory operand, based on the instruction set architecture (ISA) implemented by the processors 16A-16N.

Generally, a "trap" may refer to a transfer in control flow from an instruction sequence being executed to a designated instruction sequence that is designed to handle a condition detected by the processor 16A-16N. In some cases, trap conditions may be defined in the ISA implemented by the processor. In other cases, or in addition to the ISA-defined conditions, an implementation of the ISA may define trap conditions. Traps may also be referred to as exceptions.

In one embodiment, the processors 16A-16N may implement the SPARC instruction set architecture, and may use the exception trap vector mechanism defined in the SPARC ISA. One of the reserved entries in the trap vector may be used for the coherence trap, and the alternate global registers may be used in the coherence routines to avoid register spill. Other embodiments may implement any ISA and corresponding trap/exception mechanism.

Providing some hardware for coherence in the distributed shared memory may simplify software management of the coherence, in some embodiments. Additionally, in some embodiments, performance may be improved as compared to a software-only coherence implementation.

Each processor 16A-16N may comprise circuitry for executing instructions defined in the instruction set architecture implemented by the processor. Any instruction set architecture may be used. Additionally, any processor microarchitecture may be used, including multithreaded or single threaded, superscalar or scalar, pipelined, superpipelined, in order or out of order, speculative or non-speculative, etc. In one embodiment, each processor 16A-16N may implement one or more level 1 (L1) caches for instructions and data, and thus the caches 18A-18N are level 2 (L2) caches. The processors 16A-16N may be discrete microprocessors, or may be integrated into multi-core chips. The processors 16A-16N may also be integrated with various other components, including the L2 caches 18A-18N, the memory controller 20, the I/O bridge 24, and/or the interface 26.

The L2 caches 18A-18N comprise high speed cache memory for storing instructions/data for low latency access by the processors 16A-16N. The L2 caches 18A-18N are configured to store a plurality of cache lines, which may be the unit of allocation and deallocation of storage space in the cache. The cache line may comprise a contiguous set of bytes from the memory, and may be any size (e.g. 64 bytes, in one embodiment, or larger or smaller such as 32 bytes, 128 bytes, etc.). The L2 caches 18A-18N may have any configuration (direct-mapped, set associative, etc.) and any capacity. Cache lines may also be referred to as cache blocks, in some cases.

The memory controller 20 is configured to interface to the memory 22 and to perform memory reads and writes responsive to the traffic on the interconnect 28. The memory 22 may comprise any semiconductor memory. For example, the memory 22 may comprise random access memory (RAM), such as static RAM (SRAM) or dynamic RAM (DRAM). Particularly, the memory 22 may comprise asynchronous or synchronous DRAM (SDRAM) such as double data rate (DDR or DDR2) SDRAM, RAMBUS DRAM (RDRAM), etc.

The I/O bridge 24 may comprise circuitry to bridge between the interconnect 28 and one or more I/O interconnects. Various industry standard and/or proprietary interconnects may be supported, e.g. peripheral component interconnect (PCI) and various derivatives thereof such as PCI Express, universal serial bus (USB), small computer systems interface (SCSI), integrated drive electronics (IDE) interface, Institute for Electrical and Electronic Engineers (IEEE) 1394 interfaces, Infiniband interfaces, HyperTransport links, network interfaces such as Ethernet, Token Ring, etc. In other embodiments, one or more interface circuits such as the interface 26 may directly couple to the interconnect 28 (i.e. bypassing the I/O bridge 24).

The coherent interconnect 28 comprises any communication medium and corresponding protocol that supports hardware coherence maintenance. The interconnect 28 may comprise, e.g., a snoopy bus interface, a point to point packet interface with probe packets included in the protocol (or other packets used for coherence maintenance), a ring interface, etc. The non-coherent interconnect 14 may not include support for hardware coherency maintenance. For example, in one embodiment, the interconnect 14 may comprise Infiniband. Other embodiments may use any other interconnect (e.g. HyperTransport non-coherent, various I/O or network interfaces mentioned above, etc.). In other embodiments, the interconnect 14 may include support for hardware coherence maintenance, but such support may not be used to maintain coherence over the distributed shared memory system.

The system 10 as a whole may have any configuration. For example, the nodes 12A-12D may be "blades" in a blade server system, stand-alone computers coupled to a network, boards in a server computer system, etc.

It is noted that, while 4 nodes are shown in the system 10 in FIG. 1, other embodiments may include any number of 2 or more nodes, as desired. The number of processors 16A-16N in a given node may vary, and need not be the same number as other nodes in the system.

Figure 2:
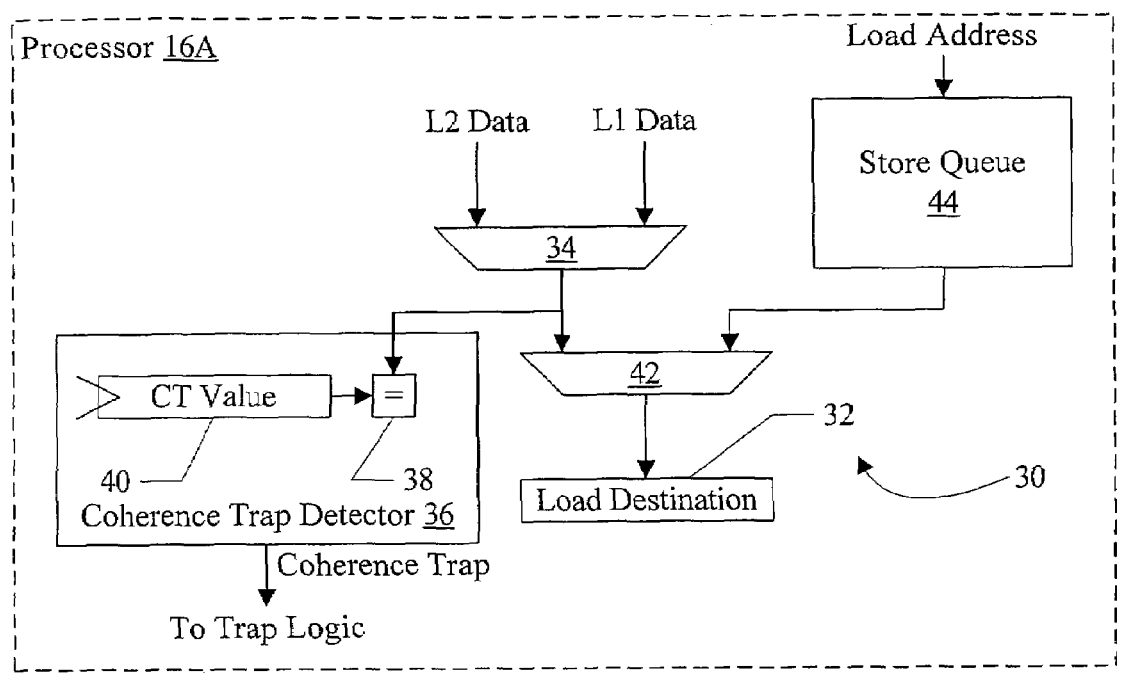
FIG. 2 is a block diagram of one embodiment of a load data path in a processor.

Turning now to FIG. 2, a block diagram of one embodiment of a portion of the processor 16A is shown in more detail. Other processors may be similar. Specifically, FIG. 2 illustrates a load data path 30 in the processor 16A for delivering load data from one or more data sources to a load destination location 32. The location 32 may comprise an architected register file, an implemented register file if register renaming is implemented, a reorder buffer, etc. In the illustrated embodiment, the data path 30 includes a mux 34 coupled to receive data from an L1 cache in the processor 16A, and the L2 cache 18A. The output of the mux 34 is coupled to a store merge mux 42 and to a coherence trap detector 36 (and more particularly a comparator 38 in the coherence trap detector 36, in the illustrated embodiment, which has another input coupled to a coherence trap (CT) value register 40). The store merge mux 42 is further coupled to receive data from a store queue 44, which is coupled to receives the load address (that is, the address of the data accessed by the load).

The coherence trap detector 36 is configured to detect whether or not the data being provided for the load is the designated value indicating that a coherence trap is needed to coherently access the data. In the illustrated embodiment, the CT value is programmable in the CT value register 40. The CT value register 40 may be software accessible (i.e. readable/writable). The CT value register 40 may, e.g., be an implementation specific register, model specific register, etc. Having the CT value programmable may provide flexibility in the scheme. For example, if a given CT value is too often causing false traps (traps that occur because the CT value is the actual, valid value that is the result of the memory access), the CT value can be changed to a less frequently occurring value. Other embodiments may employ a fixed value (e.g. "DEADBEEF" in hexadecimal, or any other desired value).

The size of the CT value may vary from embodiment to embodiment. For example, the size may be selected to be the default size of load/store operations in the ISA. Alternatively, the size may be the most commonly used size, in practical code executed by the processors. For example, the size may be 32 bits or 64 bits, in some embodiments, although smaller or larger sizes may be used.

The comparator 38 compares the load data to the CT value to detect the CT value. In fixed CT value embodiments, the coherence trap detector 36 may decode the load data. In either case, the coherence trap detector 36 may assert a coherence trap signal to the trap logic in the processor 16A. In some embodiments, the output of the comparator 38 may be the coherence trap signal. In other embodiments, the comparison may be qualified. For example, the comparison may be qualified with an indication that the CT value register 40 is valid, a mode indication indicating that the coherence trap is enabled, etc.

As mentioned above, the load data path 30 directs load data from one or more data sources to the load destination 32. The mux 34 selects among possible non-speculative sources (such as the L1 and L2 caches). Additional non-speculative sources may include the memory 22 or other cache levels. While a single mux 34 is shown in FIG. 2, any selection circuitry may be used (e.g. hierarchical sets of muxes).

Additionally, some or all of the load data may be supplied by one or more stores queued in the store queue 44. The store queue 44 may queue store addresses and corresponding store data to be written to the caches and/or the memory for uncommitted store operations. If a given store precedes the load and updates one or more bytes accessed by the load, the store data is actually the correct data to forward to the load destination 32 for those bytes (assuming that the store is ultimately retired and commits the data to memory). The store queue 44 may receive the load address corresponding to the load, and may compare the address to the store addresses. If a match is detected, the store queue 44 may forward the corresponding data for the load. Accordingly, the store merge mux 42 is provided to merge memory data with store data provided from the store queue 44.

The coherence trap detector 36 is coupled to receive the data from the load data path prior to the merging of the store data. In general, the coherence trap detector 36 may receive the data from any point in the load data path that excludes store data from the store queue 44. The store queue 44 stores actual data to be written to memory, and thus is known to be valid data (not the designated value indicating that a trap is to be taken). Furthermore, the stores in the store queue 44 may be speculative. Accordingly, there is no guarantee that the data from the memory location(s) written by the store is valid in the node, or that the node has write permission to the memory location(s). By checking the data prior to the merging of the store data, the CT value may be observed prior to overwriting by the store data. Furthermore, the check may be performed, in some embodiments, to maintain total store ordering (TSO), if TSO is implemented. The check may be implementation-specific, and may not be implemented in other embodiments.

The trap logic may associate a trap signalled by the coherence trap detector 36 with the appropriate instruction. Alternatively, an identifier may be assigned to the memory operation and pipelined with the operation. The coherence trap detector 36 may forward the identifier with the coherence trap indication to the trap logic. In yet another embodiment, the address at which the corresponding instruction is stored (often referred to as the program counter, or PC) may be forwarded to identify the instruction.

Figure 3:
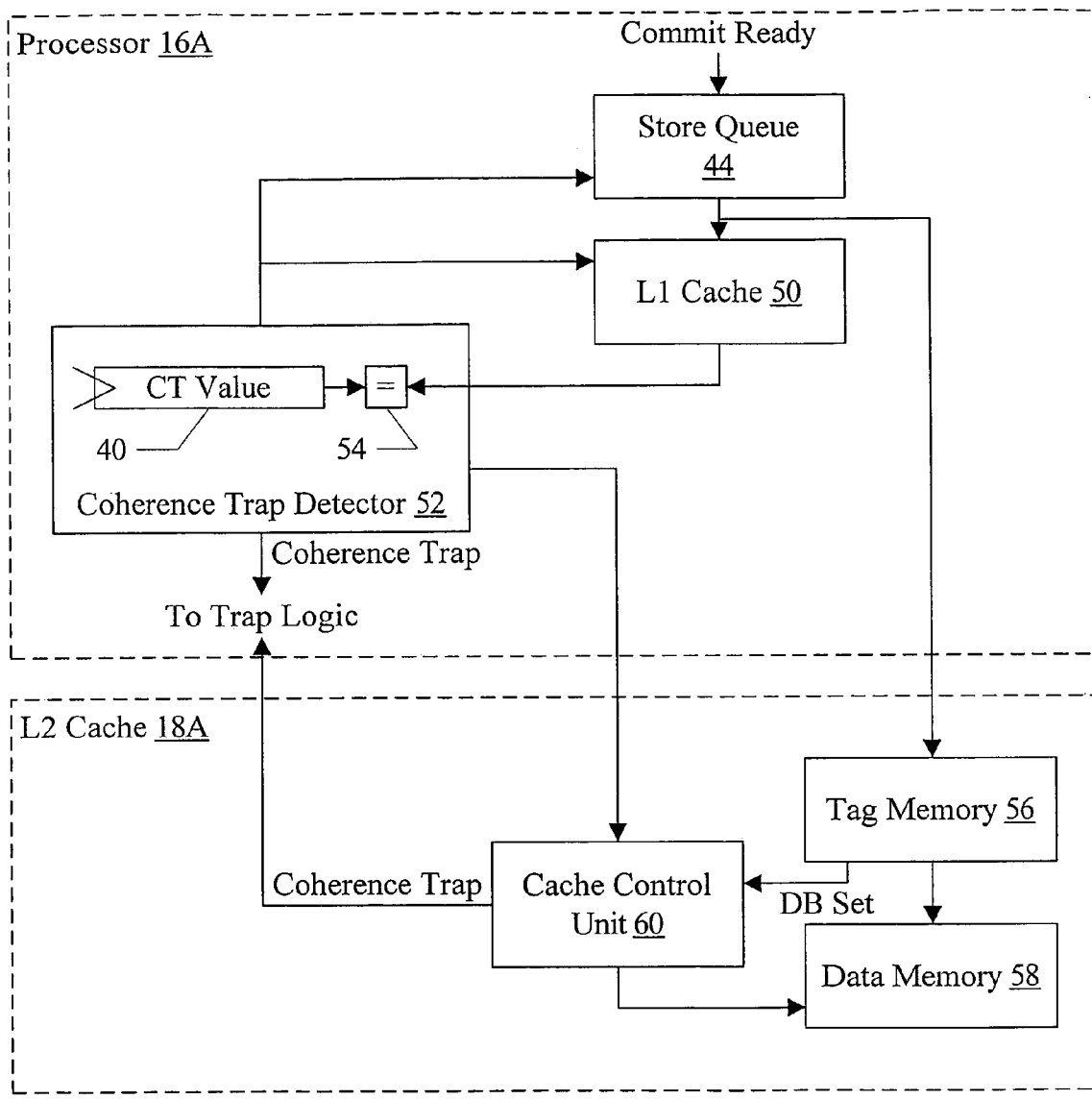
FIG. 3 is a block diagram of one embodiment of a store commit path in a processor and an associated cache.

Turning next to FIG. 3, a block diagram of one embodiment of a portion of the processor 16A is shown in more detail. Other processors may be similar. Specifically, FIG. 3 illustrates a store commit path in the processor 16A (and to the L2 cache 18A, as applicable) for committing the store data. The store queue 44 is shown, coupled to receive a commit ready indication for a store, indicating that it can commit its data to memory. The store queue 44 is coupled to an L1 cache 50, which is coupled to a coherence trap detector 52 having a comparator 54 and the CT value register 40. The store queue 44 is also coupled to the L2 cache 18A, and more particularly to a tag memory 56. The tag memory 56 is coupled to a data memory 58 and a cache control unit 60. The cache control unit 60 is further coupled to the tag memory 58 and to supply a coherence trap indication to the trap logic in the processor 16A. It is noted that there may be one or more pipeline stages and buffers between the store queue 44 and the caches 50 and 18A, in various embodiments.

In response to the commit ready indication, the store queue 44 may read the store address and store data corresponding to the identified store to write the cache 50. The read need not occur immediately, and may be delayed for earlier stores or other reasons such as availability of a port on the cache 50. The store address and data are presented to the L1 cache 50. The L1 cache 50 may read the data that is being overwritten by the store, and may provide the data to the coherence trap detector 52. The coherence trap detector 52 may determine if the data is the CT value indicating a coherence trap, and may signal the trap, similar to the coherence trap detector 36 described above with regard to FIG. 2.

If the store cannot be completed in the L1 cache 50, the store may be presented to the L2 cache 18A. The L2 cache 18A may have a pipelined construction in which the tag memory 56 is accessed first, and the cache line that is hit (or a cache miss) may be determined. The tag memory 56 may store a plurality of cache tags that identify a plurality of cache lines stored in the cache data memory 58. The hit information may be used to access the correct portion of the cache data memory 58. If a miss is detected, the data memory 58 may not be accessed at all. Given this construction, it may be more complicated to detect the CT value in the cache data prior to committing the store. Accordingly, whether or not the cache line is storing the CT value may be tracked in the tag memory 56. The tag memory 56 may output a DB set indication to the cache control unit 60 to indicate that the tag for the cache line indicates that a coherence trap is needed. The cache control unit 60 may signal the trap logic in the processor 16A in response, possibly qualifying the DB set indication with other information (e.g. a mode bit indicating that the coherence trap is enabled, etc.).

While the L1 cache 50 is shown using a coherence trap detector 52 in this embodiment, other embodiments may track whether or not the cache data indicates a coherence trap in the L1 tag memory also, similar to the L2 cache 18A. In other embodiments, the L2 cache 18A may use a coherence trap detector similar to detector 52. Still further, in some embodiments, the L1 cache 50 may be write-through and may not allocate a cache line for a write miss. In such an embodiment, the data check for stores may only be performed on the L2 cache 18A.

If a store causes a coherence trap, the store may be retained in the store queue (or another storage location) to be reattempted after write permission has been established for the store. The coherence trap detector 52 is coupled to the store queue 44, the L1 cache 50, and the cache control unit 60 in the L2 cache 18A to facilitate such operation, in the illustrated embodiment. That is, the coherence trap detector 52 may signal the store queue 44, the L1 cache 50, and the cache control unit 60 of the trap for the store. The caches may prevent the cache line from being read while write permission is obtained, and the store queue 44 may retain the store.

Additionally, the coherence code executes with the store still stalled in the store queue 44. Accordingly, the store queue 44 may permit memory operations from the coherence code to bypass the stalled store. The processor 16A may support a mechanism for the coherence code to communicate that the store may be reattempted to the store queue 44 (e.g. a write to a processor-specific register), or the store queue 44 may continuously reattempt the store until the store succeeds. In one embodiment, the processor 16A may be multithreaded, including two or more hardware "strands" for concurrent execution of multiple threads. One strand may be dedicated to executing coherence code, and thus may avoid the store queue entry occupied by the stalled store that caused the coherence trap. In one particular embodiment, a dedicated entry or entries separate from the store queue 44 may be used by the coherence code (e.g. by writing processor-specific registers mapped to the entry). The dedicated entry(ies) may logically appear to be the head of the store queue 44, arid may thus bypass the stalled store in the store queue 44.

Figure 4:
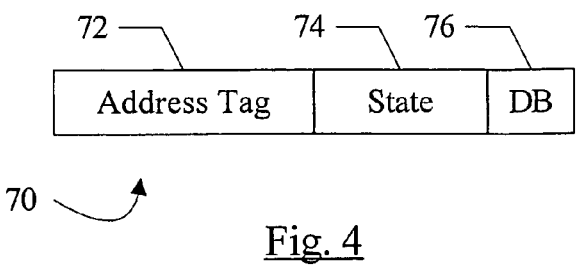
FIG. 4 is a block diagram of one embodiment of a cache tag.

FIG. 4 is a block diagram illustrating one embodiment of a cache tag 70 from the tag memory 56 for one embodiment. The cache tag 70 includes an address tag field 72, a state field 74, and a DB bit 76. The DB bit 76 may logically be part of the state field 74, but is shown separately for illustrative purposes. The DB bit 76 may track whether or not the cache line identified by the cache tag 70 in the data memory 58 is storing the CT value (or will be storing the CT value, if the CT value is in the process of being written to the cache line). For example, the bit may be set to indicate that the cache line is storing the designated value, and may be clear otherwise. Other embodiments may reverse the meaning of the set and clear states, or may use a multibit indication.

The state field 74 may store various other state (e.g. whether or not the cache line is valid and/or modified, replacement data state for evicting a cache line in the event of a cache miss, etc.). The address tag field 72 may store the tag portion of the address of the cache line (e.g. the address tag field may exclude cache line offset bits and bits used to index the cache to select the cache tag 70).

Figure 5:
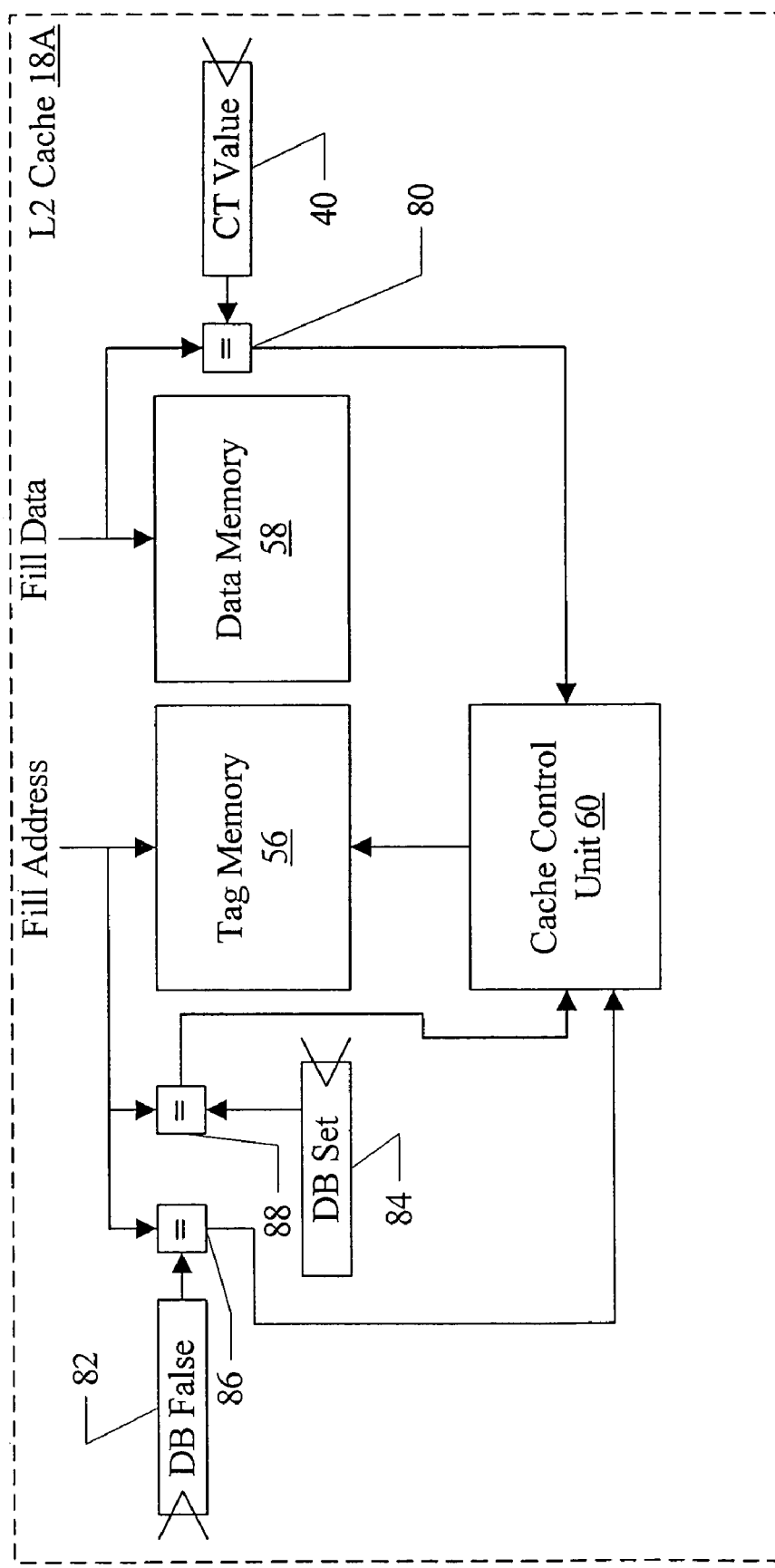
FIG. 5 is a block diagram of one embodiment of fill logic within a cache.

Turning now to FIG. 5, a block diagram of one embodiment of a portion of the L2 cache 18A is shown. Other L2 caches may be similar. The portion illustrated in FIG. 5 may be used when a missing cache line is loaded into the L2 cache 18A (referred to as a reload or a fill). Specifically, the portion shown in FIG. 5 may be used to establish the DB bit in the tag for the cache line as the cache line is loaded into the cache.

As illustrated in FIG. 5, the tag memory 56 is coupled to receive the fill address and the data memory is coupled to receive the fill data. The fill address and data may be muxed into the input to the tag memory 56/data memory 58 with other address/data inputs. Additionally, the fill address and corresponding fill data may be provided at different times. A comparator 80 is also coupled to receive the fill data, or a portion thereof that is the size of the CT value. The comparator 80 also has another input coupled to the CT value register 40. If the data matches the CT value in the register 40, the comparator 80 signals the cache control unit 60. It is noted that the CT value register 40 shown in FIGS. 2, 3, and 5 may be logically the same register, but may physically be two or more copies of the register located near the circuitry that uses the register.

In addition to detecting the CT value in the fill data, certain additional checks may be implemented using the DB false register 82 and the DB set register 84, coupled to corresponding comparators 86 and 88 (each of which is coupled to receive the fill address). These checks may help to ensure that the CT value is correctly detected or not detected in the fill data. Both the DB false register 82 and the DB set register 84 may be accessible to software, similar to the CT value register 40.

The DB false register 82 may be used by the software coherence routine to indicate when data actually has the CT value as the valid, accurate value for that memory location (and thus no coherence trap is needed). Software may write the address of the cache line with the CT value to the DB false register 82. If the fill address matches the contents of the DB false register 82, the cache control unit 60 may not set the DB bit in the cache tag even though the comparator 80 asserts its output signal.

The DB set register 84 may be used by the software coherence routine to indicate that a cache line that has not been fully set to the CT value is, in fact, invalid for coherence reasons. The DB set register 84 may be used to cover the time when the cache line is being written, since the size of the largest store in the ISA is smaller than a cache line (e.g. 8 bytes vs. 64 bytes). Software may write the address of a cache line being written with the CT value to the DB set register 84, and a match of the fill address to the contents of the DB set register 84 may cause the cache control unit 60 to set the DB bit, even if the CT value register 40 is not matched by the fill data.

It is noted that, in some embodiments, the amount of fill data (and/or data provided from a cache, e.g. the L1 cache 50 in FIG. 3) is larger than the CT value register. In one embodiment, the most significant data bytes from a cache line output from the cache, or within the fill data, may be compared to the CT value register to detect the CT value in the data. In another embodiment, the cache line data may be hashed in some fashion to compare the data. For example, if the CT value were 8 bytes, every 8th byte could by logically ANDed or ORed to produce an 8 byte value to compare to the CT value.

Figure 6:
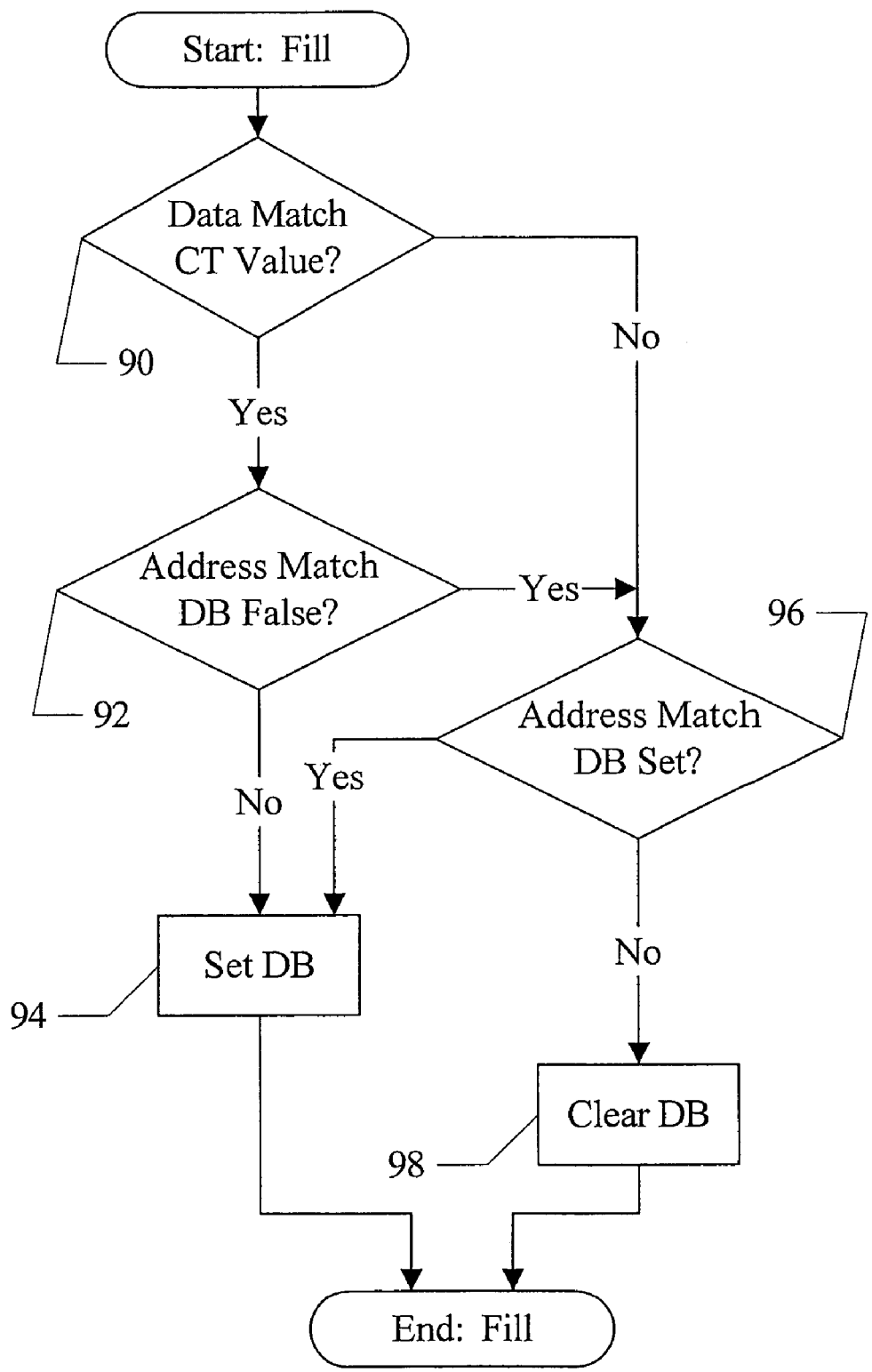
FIG. 6 is a flowchart illustrating operation of one embodiment of a cache control unit during a fill.

FIG. 6 is a flowchart illustrating operation of one embodiment of the cache control unit 60 during a fill operation to the L2 cache 18A. While the blocks are shown in a particular order for ease of understanding, any order may be used. Blocks may be performed in parallel in combinatorial logic in the cache control unit 60. Blocks, combinations of blocks, and/or the flowchart as a whole may be pipelined over multiple clock cycles. In each case of matching against a register value below, the match may be qualified with the contents of the register being valid.

If the fill data matches the CT value (decision block 90, "yes" leg) and the fill address does not match the DB false address (decision block 92, "no" leg), the cache control unit 60 may set the DB bit in the cache tag (block 94). The fill address may be considered to "not match" the DB false address if the DB false register is not valid or if the DB false register is valid and the numerical values of the addresses do not match.

If the fill data does not match the CT value (decision block 90, "no" leg), but the fill address matches the DB set address (decision block 96, "yes" leg), the cache control unit may also set the DB bit in the cache tag (block 94). Otherwise, the cache control unit 60 may clear the DB bit in the cache tag (block 98). Again, the fill address may be considered to "not match" the DB set address if the DB set register is not valid or if the DB set register is valid and the numerical values of the addresses do not match. Similarly, the fill data may be considered to "not match" the CT value if the CT value register 40 is not valid or if the CT value register is valid and the numerical values of the data do not match.

Figure 7:
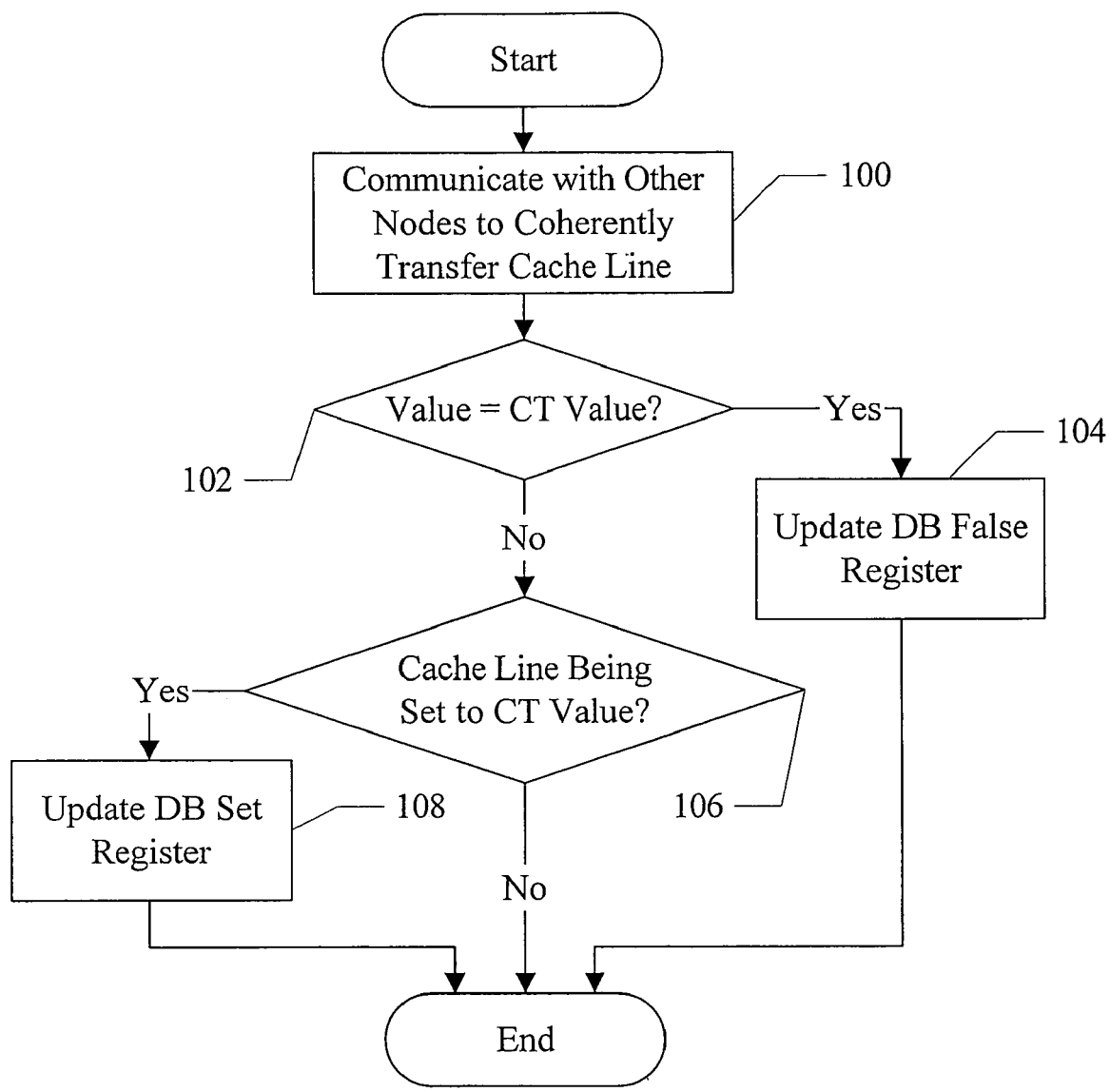
FIG. 7 is a flowchart illustrating one embodiment of coherence code.

Turning now to FIG. 7, a flowchart is shown illustrating one embodiment of coherence code (software coherence routine(s)) that may be executed in response to a coherence trap to maintain coherence. While the blocks are shown in a particular order for ease of understanding, other orders may be used. The coherence code may comprise instructions which, when executed in the system 10, implement the operation shown in FIG. 7.

The coherence code may communicate with other nodes (e.g. the coherence code in other nodes) to coherently transfer the missing cache line to the node (block 100). Any software coherence protocol may be used. In one example, the coherence code in each node may maintain data structures in memory that identify which cache lines are shared with other nodes, as well as the nodes with which they are shared, which cache lines are modified in another node, etc. The coherence code may lock an entry in the data structure corresponding to the missing cache line, perform the transfer (obtaining the most recent copy) and unlock the entry. Other embodiments may use numerous other software mechanisms, including interrupting and non-interrupting mechanisms. It is noted that software may maintain coherence at a coarser or finer grain than a cache line, in other embodiments.

If the value in the cache line is the CT value, and should be the CT value (i.e. no coherence trap is being signalled (decision block 102, "yes" leg), the coherence code may update the DB false register 82 with the address of the cache line so that no coherence trap will be signalled, at least while the data is in the L2 cache (block 104). On the other hand, if the coherence code is setting the cache line to the CT value (e.g. because the cache line ownership has been transferred to another node—decision block 106, "yes" leg), the coherence code may update the DB set register with the address of the cache line (block 108).

Figure 8:
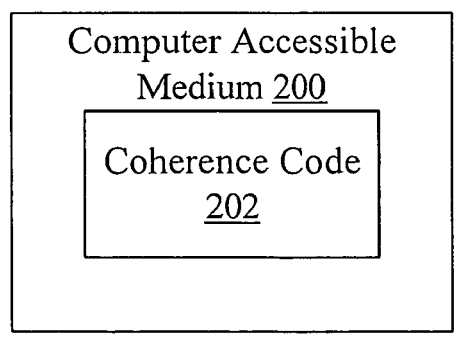
FIG. 8 is a block diagram of one embodiment of a computer accessible medium.

Turning now to FIG. 8, a block diagram of a computer accessible medium 200 is shown. Generally speaking, a computer accessible medium may include any media accessible by a computer during use to provide instructions and/or data to the computer. For example, a computer accessible medium may include storage media. Storage media may include magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link. The computer accessible medium 200 in FIG. 8 may store the coherence code 202 mentioned above. The coherence code may comprise instructions which, when executed, implement the operation described herein for the coherence code. Generally, the computer accessible medium 200 may store any set of instructions which, when executed, implement a portion or all of the flowcharts shown in one or more of FIG. 7.

Numerous variations and modifications will become apparent to those skilled in the art once the above disclosure is fully appreciated. It is intended that the following claims be interpreted to embrace all such variations and modifications.

What is claimed is:

1. A processor comprising:
   a store queue configured to store addresses to be written in response to stores and store data, and wherein the store queue is coupled to a load data path that delivers load data to a destination of the load, the store queue coupled to the load data path to forward store data for a matching load address;
   a coherence trap unit coupled to the load data path prior to a point at which the store data from the store queue is merged with other data to receive memory data accessed in response to the processor executing a load memory operation, wherein the coherence trap unit is configured to detect whether the memory data matches a designated value indicating that a coherence trap is to be initiated to coherently perform the memory operation; and
   trap logic coupled to the coherence trap unit and configured to trap to a designated software routine responsive to the coherence trap unit detecting the designated value.

2. The processor as recited in claim 1 wherein the coherence trap unit comprises a register that is programmable with the designated value.

3. The processor as recited in claim 1 wherein, for a store memory access, the coherence trap unit is configured to detect whether data prior to update by the store is the designated value.

4. The processor as recited in claim 1 wherein the coherence trap unit is configured to hash the memory data and compare the hash result data to the designated value.

5. A cache comprising:
   a data memory configured to store a plurality of cache lines of data;
   a tag memory configured to store a plurality of cache tags corresponding to the plurality of cache lines, wherein each of the plurality of cache tags comprises an indication of whether or not the corresponding cache line is storing one or more data values that match a designated value, the designated value indicating that an access to the corresponding cache line causes a trap to software to ensure cache coherence; and
   a control unit coupled to the data memory and the tag memory, wherein the control unit is configured to detect the indication responsive to a cache access and to signal a processor coupled to the cache to cause the trap.

6. The cache as recited in claim 5 further comprising a register programmable with the designated value, wherein the register is coupled to a comparator to compare the data during a fill of a cache line to determine the indication for the corresponding cache tag.

7. The cache as recited in claim 5 further comprising a register programmable to indicate that a given cache line contains the designated value but is not indicating the trap to software.

8. The cache as recited in claim 7 wherein, during a fill of a given cache line, the control unit is configured not to set the indication in the corresponding cache tag to indicate the trap responsive to the register, even if the data loaded into the cache line includes the designated value.

9. The cache as recited in claim 8 wherein the register is programmable with a tag address, and wherein the register contents are compared to the address of the access.

10. The cache as recited in claim 5 further comprising a register programmable to indicate that an access to a given cache line is to cause a trap even if the cache line does not contain the designated value.

11. The cache as recited in claim 10 wherein, during a fill of a given cache line, the control unit is configured to set the indication in the corresponding cache tag to indicate the trap responsive to the register, even if the data loaded into the cache line does not include the designated value.

12. The cache as recited in claim 11 wherein the register is programmable with a tag address, and wherein the register contents are compared to the address of the access.

13. A method comprising:
    detecting that data corresponding to a memory operation has a designated value that indicates a trap to software to ensure coherence is to be performed;
    trapping to the software responsive to the detecting; and
    programming a register to indicate that a given cache line contains the designated value but is not to cause a trap.

14. The method as recited in claim 13 further comprising programming the designated value into a register.

15. The method as recited in claim 13 wherein the detecting comprises comparing data from a load data path to the designated value.

16. The method as recited in claim 13 further comprising programming a register to indicate that a given cache line is to cause the trap even if the designated value is not detected.

17. A processor comprising:
    trap detection logic configured to detect whether coherence activity is necessary to obtain a coherent copy of data accessed by a memory operation being performed by the processor, wherein the trap detection logic is configured to detect whether coherence activity is necessary at a granularity that is no larger than a cache line, and wherein the trap detection logic is configured to detect whether coherence activity is necessary responsive to cache tag data corresponding to a cache line that includes the data accessed by the memory operation; and
    trap logic coupled to the trap detection logic and configured to trap to a designated software routine responsive to the trap detection logic detecting that the coherence activity is necessary.

18. The processor as recited in claim 17 wherein the trap detection logic is configured to compare data accessed by the memory operation to a designated value indicating a coherence trap to detect whether coherence activity is necessary.

19. The processor as recited in claim 17 wherein the cache tag data is generated by comparing the cache data to a designated value indicating a coherence trap to detect whether coherence activity is necessary.

* * * * *